US012619963B2

(12) United States Patent
Higgins et al.

(10) Patent No.: US 12,619,963 B2
(45) Date of Patent: May 5, 2026

(54) LINKING GAMING ESTABLISHMENT FUND MANAGEMENT ACCOUNT WITH FINANCIAL ACCOUNT ASSOCIATED WITH PAYMENT INSTRUMENT

(71) Applicant: IGT, Las Vegas, NV (US)

(72) Inventors: Kevin Higgins, Reno, NV (US); Lisa Schiffer, Norton, MA (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 62 days.

(21) Appl. No.: 18/195,704

(22) Filed: May 10, 2023

(65) Prior Publication Data

US 2024/0378574 A1 Nov. 14, 2024

(51) Int. Cl.
| | |
|---|---|
| *G06Q 40/02* | (2023.01) |
| *G06Q 20/10* | (2012.01) |
| *G06Q 20/40* | (2012.01) |
| *G07F 17/32* | (2006.01) |

(52) U.S. Cl.
CPC ......... *G06Q 20/102* (2013.01); *G06Q 20/407* (2013.01); *G06Q 40/02* (2013.01); *G07F 17/323* (2013.01); *G07F 17/3237* (2013.01)

(58) Field of Classification Search
None
See application file for complete search history.

(56) References Cited

U.S. PATENT DOCUMENTS

| | | | | |
|---|---|---|---|---|
| 5,465,206 A | * | 11/1995 | Hilt ........................ | G06Q 20/04 |
| | | | | 705/40 |
| 7,168,616 B2 | | 1/2007 | Carnation | |
| 8,449,388 B2 | | 5/2013 | Nicely et al. | |
| 8,676,708 B1 | * | 3/2014 | Honey ................... | G06Q 40/02 |
| | | | | 705/16 |
| 8,708,809 B2 | * | 4/2014 | Sanford ............... | G06Q 20/387 |
| | | | | 705/40 |
| 8,992,305 B2 | | 3/2015 | Sanford et al. | |
| 8,998,708 B2 | | 4/2015 | Sanford et al. | |
| 9,196,123 B2 | | 11/2015 | Sanford et al. | |
| 9,245,410 B2 | | 1/2016 | Anderson et al. | |
| 9,342,831 B1 | * | 5/2016 | Davis ..................... | G06Q 20/40 |
| 9,466,176 B2 | | 10/2016 | Sanford et al. | |
| 9,685,039 B2 | | 6/2017 | Evans | |
| 9,785,926 B2 | | 10/2017 | Sanford et al. | |
| 9,990,642 B2 | | 6/2018 | Strock et al. | |
| 10,062,072 B2 | * | 8/2018 | Davis ................... | G06Q 20/386 |
| 10,242,352 B2 | | 3/2019 | Sanford et al. | |

(Continued)

*Primary Examiner* — William J Jacob

(74) *Attorney, Agent, or Firm* — Neal, Gerber & Eisenberg LLP

(57) ABSTRACT

Systems and methods that, responsive to a receipt, from a component of a credit card issuer, of a request for payment of an amount of debt incurred in association with a credit card, utilize funds associated with a gaming establishment account to transact against an amount of funds owed in association with a financial account associated with the credit card. If a determination, based on the gaming establishment account, occurs to authorize the payment of the amount of debt incurred in association with the credit card, the systems and methods automatically initiate a transfer of an amount of funds associated with the amount of debt from the gaming establishment account to the account associated with the credit card.

16 Claims, 4 Drawing Sheets

(56) References Cited

U.S. PATENT DOCUMENTS

| | | | |
|---|---|---|---|
| 10,504,326 B2 | 12/2019 | Sanford et al. | |
| 10,559,169 B2 | 2/2020 | Scott et al. | |
| 10,607,445 B2 | 3/2020 | Higgins et al. | |
| 10,713,893 B2 | 7/2020 | Sanford et al. | |
| 10,916,092 B2 | 2/2021 | Richards et al. | |
| 10,930,115 B2 | 2/2021 | Sanford et al. | |
| 2003/0126079 A1* | 7/2003 | Roberson | G06Q 20/403 |
| | | | 705/40 |
| 2005/0187012 A1* | 8/2005 | Walker | G07F 17/3239 |
| | | | 463/25 |
| 2006/0167766 A1 | 7/2006 | Kassel et al. | |
| 2007/0293307 A1* | 12/2007 | DeRosa-Grund | G07F 17/32 |
| | | | 463/25 |
| 2008/0026816 A1 | 1/2008 | Sammon et al. | |
| 2008/0287187 A1 | 11/2008 | Seelig et al. | |
| 2011/0218905 A1* | 9/2011 | Zeringue | G06Q 20/10 |
| | | | 705/38 |
| 2013/0073446 A1* | 3/2013 | Lee | G06Q 40/06 |
| | | | 705/38 |
| 2013/0130781 A1 | 5/2013 | Anderson et al. | |
| 2014/0006192 A1* | 1/2014 | Brown | G06Q 40/02 |
| | | | 705/19 |
| 2014/0094284 A1* | 4/2014 | Sanford | G07F 17/3251 |
| | | | 463/25 |
| 2015/0243122 A1 | 8/2015 | Saffari et al. | |
| 2016/0210599 A1* | 7/2016 | Liberi | G06Q 20/102 |
| 2017/0178124 A1* | 6/2017 | Havilio | G06Q 20/382 |
| 2017/0200158 A1* | 7/2017 | Honey | G06Q 20/403 |
| 2017/0278351 A1* | 9/2017 | Dominic | G07F 17/3255 |
| 2018/0197175 A1* | 7/2018 | Groarke | G06Q 30/06 |
| 2018/0365680 A1* | 12/2018 | Davis | G06Q 20/407 |
| 2019/0378137 A1* | 12/2019 | Honey | G06Q 30/0635 |
| 2020/0372755 A1 | 11/2020 | Shepherd et al. | |
| 2021/0104119 A1 | 4/2021 | Higgins et al. | |
| 2021/0104122 A1 | 4/2021 | Shepherd et al. | |
| 2022/0044313 A1* | 2/2022 | Cox | G06Q 40/02 |
| 2022/0351285 A1* | 11/2022 | Zeringue | G06Q 20/10 |
| 2023/0230447 A1* | 7/2023 | Negussie | G07F 17/3237 |
| | | | 463/25 |
| 2024/0005731 A1* | 1/2024 | Shepherd | G06Q 20/401 |

* cited by examiner

LINKING GAMING ESTABLISHMENT FUND MANAGEMENT ACCOUNT WITH FINANCIAL ACCOUNT ASSOCIATED WITH PAYMENT INSTRUMENT

CROSS-REFERENCE TO RELATED APPLICATIONS

This application is related to the following commonly owned co-pending patent applications: U.S. application Ser. No. 18/195,666, entitled "ON-DEMAND ACCESS TO FUNDS OF GAMING ESTABLISHMENT FUND MANAGEMENT ACCOUNT ASSOCIATED WITH A FINANCIAL ACCOUNT."; and U.S. application Ser. No. 18/195,731, entitled "GAMING ESTABLISHMENT FUND MANAGEMENT ACCOUNT EMPLOYED TO DETERMINE DYNAMIC LIMIT OF FINANCIAL ACCOUNT,".

BACKGROUND

In various embodiments, the systems and methods of the present disclosure utilize funds associated with a gaming establishment account to transact against an amount of funds owed in association with a financial account.

Casinos are associated with multiple different channels of commerce including gaming activities (e.g., wagers on plays of games at electronic gaming machines and gaming tables) and non-gaming activities (e.g., making retail purchases at point-of-sale terminals throughout the casino).

BRIEF SUMMARY

In certain embodiments, the present disclosure relates to a system including a processor, and a memory device that stores a plurality of instructions. When executed by the processor responsive to a receipt, from a component of a credit card issuer, of data associated with a request for payment of an amount of debt incurred in association with a credit card and responsive to a determination, based on a gaming establishment account, to authorize the payment of the amount of debt incurred in association with the credit card, the instructions cause the processor to automatically initiate a transfer of an amount of funds associated with the amount of debt from the gaming establishment account to an account associated with the credit card. When executed by the processor responsive to the receipt, from the component of the credit card issuer, of data associated with the request for payment of the amount of debt incurred in association with the credit card and responsive to a determination, based on the gaming establishment account, to reject the payment of the amount of debt incurred in association with the credit card, the instructions cause the processor to communicate a denial to the component of the credit card issuer.

In certain embodiments, the present disclosure relates to a system including a processor, and a memory device that stores a plurality of instructions. When executed by the processor responsive to an occurrence of a credit card payment event following an issuance of a credit card statement, the instructions cause the processor to determine if an amount of funds associated with a gaming establishment account at least equals an amount of funds owed in association with a credit card. When executed by the processor responsive to the determination that the amount of funds associated with the gaming establishment account at least equals the amount of funds owed in association with the credit card, the instructions cause the processor to cause a transfer of at least the amount of funds owed in association with the credit card from the gaming establishment account to an account associated with the credit card and maintained by a component of a credit card issuer.

In certain embodiments, the present disclosure relates to a method of operating a system. Responsive to a receipt, from a component of a credit card issuer, of data associated with a request for payment of an amount of debt incurred in association with a credit card and responsive to a determination, based on a gaming establishment account, to authorize the payment of the amount of debt incurred in association with the credit card, the method includes automatically initiating, by a processor, a transfer of an amount of funds associated with the amount of debt from the gaming establishment account to an account associated with the credit card. Responsive to the receipt, from the component of the credit card issuer, of data associated with the request for payment of the amount of debt incurred in association with the credit card and responsive to a determination, based on the gaming establishment account, to reject the payment of the amount of debt incurred in association with the credit card, the method includes communicating a denial to the component of the credit card issuer.

Additional features are described herein, and will be apparent from the following Detailed Description and the figures.

DETAILED DESCRIPTION

Figure 1:
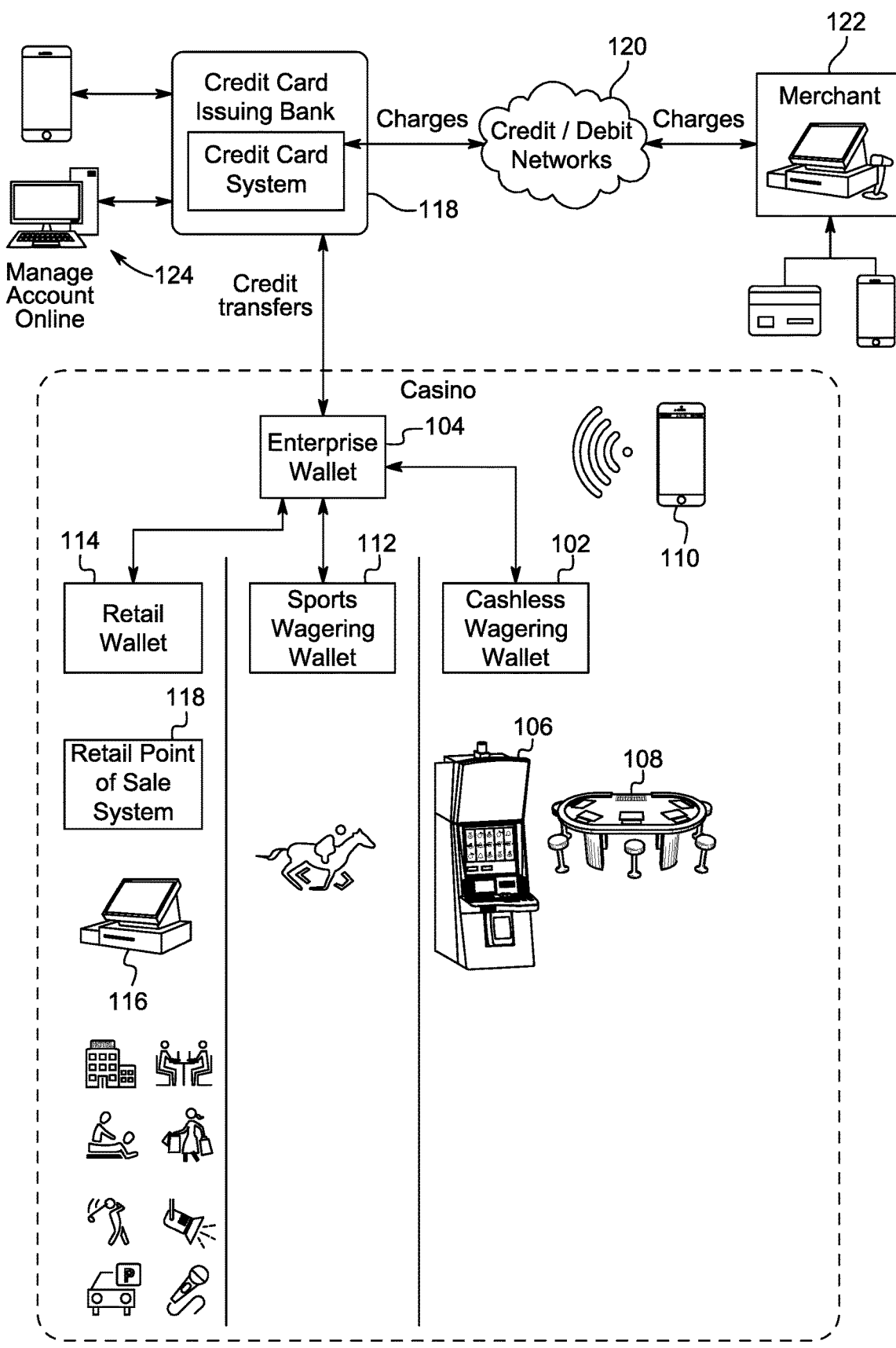
FIG. 1 is an example configuration of the architecture of a plurality of different components of the system of the present disclosure.

In various embodiments, the systems and methods of the present disclosure utilize funds associated with a gaming establishment account to transact against an amount of funds owed in association with a financial account.

In certain embodiments, the system of the present disclosure integrates or otherwise links one or more gaming establishment accounts maintained by a gaming establishment fund management system with a credit card associated with a financial account. The credit card is operable with a network payment processor to enable financial transactions at a merchant remote and independent from any gaming establishments (as well as a merchant associated with a gaming establishment). In these embodiments, following one or more purchases made using the linked credit card and responsive to an occurrence of a credit card payment event, the gaming establishment fund management system determines if one or more gaming establishment accounts are associated with an amount of funds to satisfy part or all of the amount of debt owed in association with the credit card. In certain embodiments, the credit card payment event occurs responsive to one or more user inputs. In certain other embodiments, the credit card payment event automatically occurs as part of a payment schedule, occurs responsive to one or more purchases being made or occurs responsive to the settlement, with the financial account associated with the credit card, of one or more purchases made using the credit card. In these embodiments, following the occurrence of the credit card payment event, if the gaming establishment fund management system determines that one or more gaming establishment accounts are associated with the requested amount of funds, the system transfers funds from one or more gaming establishment accounts maintained by the gaming establishment fund management system to the financial account associated with the credit card. As such, the system employs the funds residing in the gaming establishment account to settle part or all of the credit card account balance without requiring the user to first transfer any funds from the gaming establishment account to an intermediate account, thereby saving the user time and the system resources via the elimination of certain fund transfers. Such a configuration of holding funds in a gaming establishment account until such funds are requested to settle debt incurred in association with one or more credit card facilitated purchases provides a relatively frictionless experience via not requiring users to transfer funds from their gaming establishment account to another account to then be used to pay for prior credit card facilitated purchases. Such a configuration of utilizing a credit card linked to a gaming establishment account to make purchases further affords the user additional consumer protection for use of the credit card (relative to other purchase funding options) as well as enhanced loyalty benefits for use of the credit card (relative to other purchase funding options).

In operation of certain embodiments, upon a component of a financial institution that issues a credit card linked to a gaming establishment account receiving a request for a credit card transaction initiated from a point-of-sale terminal of a merchant, such as a merchant remote from a gaming establishment, the component of the financial institution (e.g., a server of a credit card issuer) determines whether or not to authorize the requested credit card transaction based on an amount of available funds associated with the credit card. In these embodiments, the determination to authorize the credit card transaction is based on an amount of debt associated with the credit card relative to a static credit limit associated with the credit card. In operation of certain other embodiments, upon a component of a financial institution that issues a credit card linked to a gaming establishment account receiving a request for a credit card transaction occurring remote from a gaming establishment, the component of the financial institution interacts with a component of a gaming establishment fund management system (e.g., a server of the gaming establishment fund management system) to determine whether or not to authorize the requested credit card transaction additionally or alternatively at least partially based on an amount of funds held in the gaming establishment account. In these embodiments, the determination to authorize the credit card transaction is based on an amount of debt associated with the credit card relative to a dynamic credit limit associated with the credit card and based on an amount of funds in one or more gaming establishment accounts. In such embodiments, employing the funds held in the gaming establishment account to factor into whether or not to authorize the requested credit card transaction (via the dynamic credit limit) enables the transactions available to be made using the credit card to change as funds flow into (or out from) the gaming establishment account.

In certain embodiments, if the requested credit card transaction is denied, such as because a restriction is associated with the credit card or the gaming establishment account associated with the credit card, the component of the financial institution notifies the point-of-sale terminal of the denial of the transaction such that the point-of-sale terminal does not complete the attempted transaction. On the other hand, if the requested credit card transaction is authorized, the component of the financial institution notifies the point-of-sale terminal of the approval of the transaction (such that the point-of-sale terminal is authorized to complete the attempted transaction). As part of the authorized transaction, the financial institution that issued the credit card causes a transfer of funds to a destination account, such as an account associated with the retailer.

In addition to utilizing a credit card associated with or otherwise linked to a gaming establishment account to facilitate zero, one or more purchase transactions, the system monitors for an occurrence of a credit card payment event. Such a credit card payment event may occur contemporaneously with the authorized transaction or subsequent to the authorized transaction. In different embodiments, a credit card payment event is triggered by the user making one or more inputs to pay an amount owed on a credit card, automatically triggered responsive to a scheduled payment of an amount owed on a credit card, or triggered responsive to a credit card settlement event for one or more individual purchases. In these embodiments, upon an occurrence of a credit card payment event, the system transfers (or attempts to transfer) an amount of funds from the gaming establishment account to an account associated with the credit card. That is, rather than requiring the user to first make one or more inputs to transfer funds from the gaming establishment account to another account, such as a financial institution checking account or an electronic wallet, and then make one or more additional inputs to transfer funds from that other account to the account associated with the credit card, the system of the present disclosure enables the user to transfer funds from the gaming establishment account to the account associated with the credit card independent of the employment of another account. In other words, the direct transfer of funds between the gaming establishment account and the credit card account to settle a debt associated with a credit card provides an improvement over prior systems by reducing the amount of interactions the user has to have to pay such credit card debt as well as reduces the computational load on various components and the bandwidth required by such components by eliminating certain transactions previously required to pay such credit card debt. Accordingly, the system of the present disclosure enables a gaming establishment account to operate as a long term holding account in which funds are available not only to be transferred to gaming establishment devices for wagering activities and non-wagering activities associated with a gaming establishment, but such funds are also available to fund the payment of credit card transactions occurring independent of the gaming establishment. Such a configuration enables funds maintained in a gaming establishment account to be accessed to fund a purchase transaction using a credit card issued by a financial institution wherein the funds are transferred, on demand, from the gaming establishment account to settle debt of a credit card account maintained by the financial institution without the need to wait for any fund transfer to be completed (or alternatively pay various surcharge fees to expedite any fund transfers).

It should be appreciated that unlike prior payment solutions in which if a user wants to access their funds held in a casino account at a retail establishment outside of the casino, the user needs to first manually transfer their funds to a bank account (after which the user can then pay at that retail establishment outside of the casino using a payment instrument associated with their bank account), or alternatively first manually transfer their funds to an electronic wallet (after which the user can use a payment instrument associated with their electronic wallet to pay at that retail establishment outside of the casino), the present disclosure enables a user to maintain their funds in a casino account while still availing themselves of the use of a credit card (linked to the casino account) for purchases made outside of the casino. In these embodiments, by employing funds held in a gaming establishment account to be transferred to settle a debt of an account associated with a credit card, the system of the present disclosure enables the user to realize the benefits of maintaining funds in a gaming establishment account while still having access to such funds when needed to pay off charges incurred using the linked credit card. In other words, by linking a credit card account associated with a credit card with one or more gaming establishment accounts, the present disclosure enables such a credit card to function as an interface to remotely access funds from such gaming establishment accounts. Such a configuration thus enables a user with funds in a gaming establishment account, such as a cashless wagering account, to access the network payment processors accessible with a credit card without needing to manually arrange a pre-set transfer of any amounts of funds from the gaming establishment account to another account to gain such access. Such a configuration saves users time (e.g., no time needs to be spent transferring funds from a gaming establishment account to a banking account or waiting a dedicated amount of time for such a transfer to be completed) and offers operational efficiencies (e.g., reducing the number of touchpoints funds must flow through before they may be used) compared to prior payment solutions involving funds in a casino account. Such a configuration further provides that unlike prior payment solutions in which funds residing in a cashless wagering account (which are fully redeemable for cash) are transferred to a closed-loop pre-paid account of a retail establishment resulting in such funds no longer being redeemable for cash, the employment of a cashless wagering account linked to a credit card enables cashless wagering account funds to be accessible at the retail establishment when needed (and after the authorization of a transaction committing such funds) while still residing in the cashless wagering account (and thus still being fully redeemable for cash up until the authorization of the transaction committing such funds).

Accordingly, unlike prior systems that required one or more inputs to indirectly transfer funds in a gaming establishment account to a financial account associated with a credit card and further required a certain amount of time, such as up to three days, for the transfer to be completed, the present disclosure bypasses these relatively timely external transfers and enables the credit card issuer system to interact, in real time, with the gaming establishment fund management system such that the funds available in a gaming establishment account are available to settle debts of an account associated with a credit card. As such, the system of the present disclosure offers the benefits of credit card transactions (e.g., enhanced security measures and/or access to enhanced rewards programs offered by credit card rewards programs) without the fund transfer friction previously encountered in requiring the user to manually cause a movement of funds from a gaming establishment account to an intermediate account and then to a financial account associated with the credit card. Such a configuration provides the user relatively greater control over their funds, such as providing the user with the ability to complete a credit card payment transaction with funds held in a gaming establishment account.

As such and in view of the different channels of commerce available both in association with and independent of one or more gaming establishments, the system enables a credit card issued by a financial institution to be employed as an interface to access funds held in a gaming establishment account to pay off debt incurred using the credit card in different channels of commerce associated with or independent of one or more gaming establishments. Such transfers thus reduce the fund movement friction encountered in using funds held in a gaming establishment account to complete transactions outside of the gaming establishment network while still realizing the benefits of network payment processors offered by the use of credit cards. Such a configuration of employing a linked credit card and funds maintained in one or more gaming establishment accounts to settle debts incurred with such a linked credit card further facilitates, amongst other benefits, a more cashless environment (e.g., cash does not need to be withdrawn from a gaming establishment account and then brought to a retailer, either internal to or external from the gaming establishment, to purchase goods and/or services) which increases safety (e.g., minimizing users having to carry large sums of cash associated with large sums of money and minimizing such cash being a vehicle to spread potentially harmful contagions).

In various embodiments, the present disclosure is directed to a gaming establishment fund management system including various sub-systems that are each associated with or otherwise maintain one or more electronic or virtual accounts. In these embodiments, the various accounts maintained for a user individually or collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a retail patron, individually or collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In different embodiments, funds held in zero, one or more of these cashless wagering accounts are accessible in association with (or otherwise configured to be accessible upon one or more inputs from a user and/or gaming establishment personnel) a credit card to cause a transfer of such funds to/from an account associated with the credit card to settle debt incurred using the credit card to make purchases.

In certain embodiments, the gaming establishment fund management system includes a first cashless wagering system that maintains a first cashless wagering account. In these embodiments, a user, such as a player of an electronic gaming machine ("EGM"), utilizes a mobile device application running on a mobile device and/or a physical instrument (e.g., a smart card or a user issued magnetic striped card which the user utilizes via inserting the card into a card reader associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a Cashless Wagering Wallet 102 (e.g., a first cashless wagering account) which is in communication with the enterprise wallet 104. In this example, to facilitate the transfer of funds between this cashless wagering account and a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the enterprise wallet 104. In this example, to facilitate the transfer of funds between this cashless wagering account and a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable, amongst other activities, a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. In different embodiments, funds held in zero, one or more of these gaming establishment retail accounts are accessible in association with (or otherwise configured to be accessible upon one or more inputs from a user and/or gaming establishment personnel) a credit card to cause a transfer of such funds to/from an account associated with the credit card to settle debt incurred using the credit card to make purchases.

In certain embodiments, such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the enterprise wallet 104. In this example, to facilitate the transfer of funds between this gaming establishment retail account and an account associated with a gaming establishment retailer to purchase goods and/or services from the gaming establishment retailer, the system utilizes a retail wallet identity, such as a mobile device 110 running a mobile device application that interfaces with a point-of-sale terminal 116 of a retail point-of-sale system 118 of the gaming establishment retailer and/or a physical instrument (e.g., a smart card or a user issued magnetic striped card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a gaming establishment retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system is in communication with one or more external funding sources which maintain one or more external accounts for the user. In these embodiments, the gaming establishment fund management system that maintains one or more gaming establishment accounts is in communication with one or more external funding sources, such as a network of one or more banks or other financial institutions which operate to electronically transfer funds between the user's accounts maintained at such banks or financial institutions and one or more of the accounts maintained by the gaming establishment fund management system. The accounts of these external funding sources include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). For example, as seen in FIG. 1, the gaming establishment fund management system that maintains the enterprise wallet 104 is in communication with a bank or other financial institution (i.e., credit card issuing bank 118 maintaining an account associated with a credit card) which operate to electronically transfer funds between the user's account maintained at that bank or financial institution and one or more of the accounts maintained by the gaming establishment fund management system. In these embodiments, the credit card issuer system issues one or more credit cards for a user. Such a credit card and an account associated with the credit card operate to, amongst other benefits, enable funds held in one or more gaming establishment accounts of the gaming establishment fund management system to be used to pay off debts incurred using the credit card at one or more channels of commerce associated with the gaming establishment and/or independent of the gaming establishment.

It should be appreciated that while illustrated as the gaming establishment fund management system being in communication with one or more external funding sources, in different embodiments, any system or sub-system of the present disclosure can be in communication with one or more external funding sources. In certain embodiments, the gaming establishment fund management system additionally or alternatively includes a credit card issuer system. In different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to facilitate the transfer of funds to/from an external account.

In certain embodiments, the banks or other financial institutions that operate with the gaming establishment fund management system also operate with one or more retail establishments to enable the purchase of goods and/or services in association with the electronic transfer of funds to one or more of the accounts associated with such retail establishments. For example, as seen in FIG. 1, the bank or other financial institution (i.e., credit card issuing bank 118 maintaining an account associated with a credit card via a credit card system) that operates with the gaming establishment fund management system is also in communication (via credit/debit networks 120) with one or more merchants 122 where a user may purchase goods and/or services using the issued credit card and which operate with such banks or other financial institutions to electronically transfer funds to one or more accounts associated with such merchants to pay for purchased goods and/or services. Accordingly, in certain instances, the balance of one or more gaming establishment accounts are drawn down via the payment of transactions initiated by the credit card and accessible at a point-of-sale-terminal external from any gaming establishment channel of commerce (e.g., as seen in FIG. 1, merchant 122 in communication, via the credit/debit network 120, with at least the credit card issuing bank 118). In certain instances, the balance of one or more gaming establishment accounts are drawn down via the payment of transactions initiated by the credit card and accessible at a gaming device, such as an EGM 106 and/or a gaming table 108*a*. In certain instances, the balance of one or more gaming establishment accounts are drawn down via the payment of transactions initiated by the credit card and accessible at a point-of-sale terminal 116 within a gaming establishment channel of commerce.

In certain embodiments, the banks or other financial institutions that operate with the gaming establishment fund management system and one or more retail establishments enable a user to manage one or more accounts maintained by such banks or other financial institutions via one or more interfaces, such as a bank website and/or a bank mobile device application. In these embodiments, by accessing the bank or other financial institution via the available interface, the bank or other financial institution enables the user associated with one or more accounts at that bank or other financial institution to, amongst other activities, check balances and/or initiate a transfer of funds to/from such accounts. For example, as seen in FIG. 1, via one or more interfaces of one or more devices 124, the system enables a user to manage one or more accounts of such financial institutions. In different embodiments, the bank or other financial institution utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to manage such accounts.

In certain embodiments (not shown), the gaming establishment fund management system that maintains one or more gaming establishment accounts is in communication with an external funding system (i.e., a payment gateway) that is in communication with a network of one or more banks or other financial institutions which operate to electronically transfer funds between the user's accounts maintained at such banks or financial institutions and one or more of the accounts maintained by the gaming establishment fund management system. In certain embodiments, the gaming establishment fund management system that maintains one or more gaming establishment accounts includes an external funding system that is in communication with a network of one or more banks or other financial institutions which operate to electronically transfer funds between the user's accounts maintained at such banks or financial institutions and one or more of the accounts maintained by the gaming establishment fund management system. It should be appreciated that while described as the gaming establishment fund management system being in communication with the external funding system, in different embodiments, any system or sub-system of the present disclosure can be in communication with one or more external funding system. In different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interact with the external funding system to facilitate the transfer of funds to/from an external account.

In certain embodiments (not shown), the gaming establishment fund management system is in communication with one or more gaming establishment patron management systems that monitor activities at various points of contact associated with the gaming establishment and provides rewards, such as redeemable player tracking points, in association with such activities. It should be appreciated that while, in certain embodiments, the gaming establishment fund management system is in communication with one or more gaming establishment patron management systems, in different embodiments, any system or sub-system of the present disclosure can be in communication with one or more gaming establishment patron management systems. In different embodiments, the system utilizes a mobile device running a mobile device application, a kiosk, an interface of a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment patron management system.

In certain embodiments (not shown), the gaming establishment fund management system is in communication with one or more credit systems which each issue the user one or more lines of credit. These lines of credit are accessible to facilitate a transfer of funds from the line of credit issued by the credit system to (either directly or indirectly through a cashless wagering account) a credit balance of a gaming device, such as an EGM and/or a gaming table and/or to (either directly or indirectly through a gaming establishment retail account) a point-of-sale terminal (or an account associated with the point-of-sale terminal). It should be appreciated that the gaming establishment fund management system may be in communication with one or more credit systems, and in different embodiments, any system or sub-system of the present disclosure can be in communication with one or more credit systems. It should be further appreciated that in different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment credit system.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while, in certain embodiments, the gaming establishment fund management system being in communication with one or more credit reporting networks and one or more credit reporting/credit risk systems, in different embodiments, any system or sub-system of the present disclosure can be in communication with one or more credit reporting/credit risk systems.

In certain embodiments, the system utilizes one mobile device application to interact with the different components of the gaming establishment fund management system to, amongst other actions, access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to, amongst other actions, access funds associated with different gaming establishment accounts, the system utilizes a kiosk, a gaming device (e.g., an interface of an EGM or gaming table component), a service window displayed by a gaming establishment device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, a retail point-of-sale terminal, and/or a gaming establishment interface, such as a casino desk, to, amongst other actions, access the funds associated with such gaming establishment accounts. It should be further appreciated that while illustrated in FIG. 1 as using a mobile device running a mobile device application to access funds associated with different gaming establishment accounts (e.g., a cashless wagering account and a gaming establishment retail account) as mentioned above, a physical instrument, such as a smart card or a user issued magnetic striped card may additionally or alternatively be utilized to enable a user access to one or more gaming establishment accounts.

In certain embodiments, the system enables a transfer of funds between different accounts maintained by different components associated with different gaming activities and/ or non-gaming activities. In these embodiments, the system employs a service for interfacing with the various components to facilitate balance inquiry and transferring funds amongst the different accounts maintained by these various components. In certain embodiments, such a service collects data from various components and utilizes such collected data to provide a singular view of the balances (or a plurality of singular views of different groupings of balances). In certain embodiments, such a service additionally or alternatively provides facilities to enforce rules associated with the different accounts maintained by the various components. In different such embodiments, these rules include, but are not limited to, jurisdictional controls, self-imposed limits, state governmental controls and federal governmental controls, wherein the system provides the logic to determine how, and how much, to transfer from each account of the various interconnected components to satisfy a request for funds while staying within the confines of such rules. In certain embodiments, such a service additionally or alternatively tracks and coalesces transaction history across the accounts of the interconnected components of the system. In these embodiments, all transactions within the system have a "master" transaction record that ties all of the various fund transfers to a single initiating funds transfer regardless of how many accounts were withdrawn to the satisfy the original request.

In various embodiments, prior to enabling a user to purchase goods and/or services using a credit card to potentially be paid for with funds residing in a gaming establishment fund management account, a user must first open a credit card account (if needed) and procure a credit card. In one such embodiment, the credit card takes the form of a physical instrument (e.g., a smart card that stores information or a magnetic striped credit card that stores information). In another such embodiment, the credit card additionally or alternatively takes the form of a virtual instrument (e.g., a mobile device application and/or a component of a mobile device operating system that stores information and is operable with a point-of-sale terminal). In these embodiments, utilizing an interface, such as a mobile device application being executed by a mobile device, and/or a website accessed from a browser, the user attempts to open a gaming establishment account and/or open a credit card account to obtain a credit card through one or more interactive forms. For example, as part of opening a cashless wagering account, a user (whom has already logged into one or more gaming establishment fund management system accounts via a mobile device application) makes one or more inputs via an interface to provide certain user identifying information, such as, but not limited to, additional address details, a social security number and/or a mother's maiden name, and/or certain anticipated spending information, such as how the user intends to spend the funds withdrawn from such a credit card account if opened. In certain embodiments, the system enables a user to enroll or otherwise sign up for such accounts via other avenues, such as via picking up an application at various locations, via a mobile application running on a mobile device, via a point-of-sale terminal, via an EGM, via a kiosk and/or via adding a gaming establishment fund management account to an existing patron account, such as a player tracking account.

In certain embodiments, following the opening of a credit card account associated with a credit card, the system links the credit card account to a gaming establishment fund management account, such as a cashless wagering account. In certain other embodiments, following an occurrence of a credit card linkage event, such as a user requesting to link an existing credit card account with a gaming establishment account, the system links the credit card account to a gaming establishment fund management account, such as a cashless wagering account. In these embodiments, both accounts (i.e., the credit card account and the gaming establishment fund management account) are linked to each other via one or more associations. In one such embodiment, both accounts are linked to each other through a gaming establishment patron management system identifier, such as through a player's loyalty account number of a player tracking system. In other such embodiments, both accounts are linked through one or more of: a credit card number, a gaming establishment fund management account number (e.g., a cashless wagering account number), a hash or token associated with the credit card number, a hash or token associated with the gaming establishment fund management account number, a hash or token of a gaming establishment patron management system identifier (e.g., a hash of a player tracking account number), a globally unique identifier (e.g., a 128-bit text string that represents an identification) associated with one of the accounts, and/or a primary key or unique identifier associated with one of the accounts. In certain embodiments, a component of the gaming establishment fund management system (and/or a component of the credit card issuer system) stores the relationship between the accounts in association with one or both of the accounts. In certain embodiments, a component of a separate, distinct system, such as a component of an account linkage system, stores the relationship between two or more of the various accounts, such as storing data associated with the relationships between a user's player tracking account, the user's credit card account and the user's cashless wagering account.

In certain embodiments, as part of an opening credit card account and/or a gaming establishment fund management account or in association with a previously opened credit card account and/or previously opened gaming establishment fund management account configured to transfer funds to settle part or all of a balance of a credit card, the gaming establishment fund management system and/or the credit card issuer system determines zero, one or more security measures to invoke in association with one or more transactions associated with the credit card. In these embodiments, to prevent the potential unauthorized access to funds borrowed against the credit card account and/or transferred from the user's gaming establishment account to pay off credit card debt, the system applies such determined security measures in association with certain transactions using a credit card issued to the user and/or certain transactions to access funds in a gaming establishment account to settle a debt associated with a credit card.

In certain embodiments, as part of opening a credit card account and/or a gaming establishment fund management account or in association with a previously opened credit card account and/or previously opened gaming establishment fund management account configured to transfer funds to settle part or all of a balance of a credit card, the gaming establishment fund management system and/or the credit card issuer system determines one or more controls or restrictions, such as use limits, to associate with the credit card and/or transactions to access funds in a gaming establishment account to settle a debt associated with a credit card. In certain of these embodiments, if such conditions are satisfied, the gaming establishment fund management system and/or credit card issuer system invokes one or more security measures. In certain other of these embodiments, if such conditions are satisfied, the gaming establishment fund management system and/or credit card issuer system deny the approval of a transaction associated with the credit card linked to the gaming establishment account. As such, to balance the need to prevent potential unauthorized access to the funds associated with the user's gaming establishment fund management account against the need to provide a relatively frictionless experience for users, the gaming establishment fund management system and/or credit card issuer system dynamically employs one or more controls, such as credit card usage controls, such that certain transactions trigger the need to potentially employ enhanced security measures and certain transactions do not trigger the need to potentially employ enhanced security measures.

In certain embodiments, the system enables an operator, such as a gaming establishment operator and/or an operator of the credit card issuer system, to determine and activate zero, one or more controls as well as zero, one or more security measures to employ. In these embodiments, if any operator determined controls are violated, the system attempts to prevent unauthorized access to the funds associated with the credit card linked to the user's gaming establishment fund management account. In certain embodiments, the determination to associate one or more controls and/or security measures is based on one or more inputs from an operator wherein personnel indicate that they would like one or more controls and/or security measures associated with certain of (or each of) the purchases made using the linked credit card.

In certain embodiments, the system enables a retail point-of-sale system to determine and activate one or more controls and/or security measures to associate with transactions undertaken by the retail point-of-sale system. In certain of these embodiments, the determination to associate one or more controls and/or security measures is based on one or more inputs from retail personnel whom indicate that they would like one or more controls and/or security measures associated with certain of (or each of) the purchases made in association with the retail point-of-sale system. In certain other of these embodiments, the determination to associate one or more controls and/or security measures is based on one or more settings associated with the retail point-of-sale system that dictate one or more controls and/or security measures associated with certain of (or each of) the purchases made in association with the retail point-of-sale system. In certain embodiments, one or more determinations are made at the retail point-of-sale terminal level wherein different terminals are associated with different controls and/or security measures. In certain embodiments, one or more determinations are made at the retail point-of-sale system level wherein each terminal is associated with the same controls and/or security measures.

In certain embodiments, the system enables the user to determine and activate zero, one or more controls as well as zero, one or more security measures to employ. In these embodiments, if any user determined controls are violated, the system attempts to prevent unauthorized access to the funds associated with the credit card linked to the user's gaming establishment fund management account. In certain embodiments, the determination to associate one or more controls and/or security measures is based on one or more inputs from the user wherein the user indicates that they would like one or more controls and/or security measures associated with certain of (or each of) the purchases made using the linked credit card.

In certain embodiments, the controls are associated with an identity of whom may initiate a transaction using a linked credit card and/or initiate a transaction to access funds in a gaming establishment account to settle a debt associated with a credit card. In certain such embodiments, one or more activities of the identified user may factor into the employment (or lack thereof) of controls. In certain embodiments, the controls are associated with a quantity and/or an amount of transactions using a credit card over a given period of time (e.g., hourly, daily, weekly, monthly). For example, such controls pertain to the frequency of accessing funds in a gaming establishment account to settle a debt associated with a credit card.

In certain embodiments, the controls are additionally or alternatively associated with the amount of a transaction using a credit card and/or the amount of a transaction to access funds in a gaming establishment account to settle a debt associated with a credit card. In these embodiments, certain retail purchases and/or transfers of funds from a gaming establishment account to a credit card account having a value above a threshold value that trigger the use of one or more controls while other retail purchases and/or transfers of funds from a gaming establishment account to a credit card account that have a value below the threshold value do not trigger such controls.

In certain embodiments, the controls are associated with an identity of the retailer associated with a transaction. In these embodiments, the gaming establishment fund management system and/or the credit card issuer system imposes, using a Merchant Category Code (MCC) or a white list or blacklist of retailers, controls on a type of industry or retailer thus eliminating an entire class of retailers from participating in the commerce. In certain embodiments, the controls are additionally or alternatively associated with the type of good and/or service associated with the transaction. In these embodiments, certain types of retail purchases trigger the use of one or more controls while other types of retail purchases do not trigger such controls. In certain embodiments, the controls are additionally or alternatively associated with a location of the retail purchase attempted to be made. In these embodiments, different locations are associated with different controls.

In certain embodiments, the controls are additionally or alternatively associated with a channel of commerce in which the transaction using a credit card occurs. In certain of these embodiments, different channels of commerce (in certain instances determined via the merchant identifier of the retail establishment) are associated with different controls. In certain of these embodiments, different verticals within the same channel of commerce (e.g., spending on golf activities vs spending on restaurants associated with a resort) are associated with different controls. In certain embodiments, the controls are additionally or alternatively associated with a time of when the attempted transaction occurs. In certain embodiments, the controls are additionally or alternatively associated with an amount of funds currently maintained in a gaming establishment fund management account. In certain embodiments, the controls are additionally or alternatively associated with a current rate of consumption of the funds in one or more gaming establishment accounts maintained for the user. In one such embodiment, the rate of consumption is based on an amount of transactions over a set period of time, such as the current day. In another such embodiment, the rate of consumption is based on an amount of transactions over a rolling period of time, such as the past 24 hours. It should be appreciated that in different embodiments, the system employs a combination of different controls to determine whether a transaction using a credit card and/or a transaction to access funds in a gaming establishment account to settle a debt associated with a credit card is permitted and/or any security measures need to be activated.

In certain embodiments, the system employs the same controls and/or security measures for each user. In certain embodiments, the system employs different controls and/or security measures for different users. In certain of these embodiments, the system utilizes historical data regarding the user and past transactions in determining one or more aspects of one or more controls and/or security measures to associate with that user. In certain of these embodiments, the system utilizes one or more attributes of the user, such as a player tracking account status of the user, in determining one or more aspects of one or more controls and/or security measures to associate with that user.

It should be appreciated that in certain embodiments, one or more of the controls may be overridden and/or adjusted by qualifying personnel. In these embodiments, the gaming establishment fund management system and/or the credit card issuer system associates different levels of overriding and/or adjusting of controls with different qualifying personnel. In these embodiments, the gaming establishment fund management system and/or the credit card issuer system enables different levels of overriding and/or adjusting of controls for different users based on one or more attributes, such as status or historical spend, of such users.

Following a linking of the credit card to the gaming establishment fund management account and following any required acknowledgement by the user of any required terms and conditions, the gaming establishment fund management system and/or the credit card issuer system notifies the user, if applicable, regarding the ways the user may pay for retail purchases utilizing a credit card associated with a gaming establishment account. For example, the gaming establishment fund management system and/or the credit card issuer system notifies the user, via a message displayed at any suitable device, via an email, via an SMS or text message, and/or via a notification displayed by a mobile device application.

In certain embodiments, to employ a credit card associated with a gaming establishment account, the user presents the credit card for the purchase transaction. In different embodiments, the presented credit card takes the form of one or more of a smart credit card that stores gaming establishment account information, a magnetic striped credit card that stores gaming establishment account information, a smart credit card that does not store any gaming establishment account information but is associated with a credit card number that is associated with gaming establishment account information in one or more maintained databases, a magnetic striped credit card that does not store any gaming establishment account information but is associated with a credit card number that is associated with gaming establishment account information in one or more maintained databases, a mobile device application that stores gaming establishment account information, and/or a mobile device application that does not store any gaming establishment account information but is associated with a credit card number that is associated with gaming establishment account information in one or more maintained databases.

In certain such embodiments wherein the credit card is presented in virtual or electronic form using a mobile device application, such as an electronic wallet that stores credit card data, the mobile device application prompts the user to cause the mobile device to engage the point-of-sale terminal, such as prompting the user to tap the mobile device to a designated portion of the point-of-sale terminal (or otherwise moving the mobile device to within a designated distance of a designated location of the point-of-sale terminal). Such engagement initiates a pairing or linkage between the mobile device and the point-of-sale terminal, wherein the pairing or linkage between the mobile device and the point-of-sale terminal occurs via one or more applications being run or executed on the mobile device. In this example, after such engagement, the mobile device application communicates, via a wireless communication protocol (including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol), data associated with the credit card to the point-of-sale terminal to facilitate the potential purchase of goods and/or services.

It should be appreciated that in certain embodiments, the user needs to take one or more steps to approve a transaction using a credit card. In one such embodiment, the user acknowledges the approval of using a credit card, when needed, by entering a personal identification number ("PIN") via a mobile device application, providing a signature and/or presenting a biometric identifier to a mobile device. In another embodiment, the user acknowledges the approval of using a credit card, when needed, by entering a PIN, providing a signature and/or presenting a biometric identifier to the retail point-of-sale terminal or a peripheral device associated with the retail point-of-sale terminal.

In various embodiments, upon the presentation of the credit card at an applicable point-of-sale terminal of a retail point-of-sale system, such as a point-of-sale terminal of a merchant remote and independent from any gaming establishment, the components of the systems individually or collectively determine whether or not to complete the attempted retail purchase. In these embodiments, upon receiving data or information regarding the credit card, the retail point-of-sale system communicates with the credit card issuer system to request a transfer of an amount of funds to cover the cost of the intended purchase. The credit card issuer system determines whether or not to approve the intended purchase. That is, upon the requested transfer of funds to complete the credit card facilitated retail purchase, the credit card issuer system logs the user into the credit card account associated with the user (if necessary) and determines whether to authorize the transfer of the amount of funds requested to complete the retail purchase. In these embodiments, the component of the credit card issuer system (e.g., one or more servers of the bank or other financial institution that issued the credit card) determines whether the amount of available credit associated with the attempted purchase is at least equal to the requested amount of funds to complete the transaction.

In certain embodiments, the amount of available credit associated with the credit card is based on an amount of credit remaining relative to a static credit limit. Such a static credit limit is based on one or more financial factors such as, but not limited to, a user's credit score, a user's past payment history, and/or a user's employment. In these embodiments, subject to any credit card usage controls, the component of the credit card issuer system determines the amount of funds available to potentially complete the transaction relative to an amount of unused credit remaining from a static credit limit. In certain embodiments, the amount of available credit associated with the credit card is based on an amount of credit remaining relative to a dynamic credit limit, such as a credit limit determined based on an amount of funds associated with one or more gaming establishment accounts. Such a dynamic credit limit is based on one or more of an amount of funds held in one or more gaming establishment accounts, a multiple of an amount of funds held in one or more gaming establishment accounts, an amount of funds associated with a user via a gaming establishment credit system (e.g., an amount of funds available from an activated line of credit), and one or more financial factors such as, but not limited to, a user's credit score, a user's past payment history, and/or a user's employment. In these embodiments, subject to any credit card usage controls, the component of the credit card issuer system and/or the component of the gaming establishment fund management system determine the amount of funds available to potentially complete the transaction relative to an amount of unused credit remaining from a dynamic credit limit. For example, the more funds held in a gaming establishment account associated with a linked credit card, the greater the dynamic credit limit associated with the linked credit card and the greater the benefit available to the user for using the linked credit card. It should be appreciated that employing such a dynamic credit limit not only enables a user's credit limit to be linked to the funds they hold in one or more gaming establishment accounts, but also provides the user significantly improved consumer protection (relative to an eWallet associated with a debit card) as afforded by use of a credit card (and associated consumer protection laws), and further enables the user to participate in a loyalty program with superior rewards per the same amount spent. In certain embodiments, in addition to benefiting the user, employing a dynamic credit limit associated with an amount of funds in one or more gaming establishment accounts aids the gaming establishment and/or the credit card issuer in limiting any credit risk, or bad debt risk.

If the component of the credit card issuer system indicates that the amount of funds available from the credit card account is insufficient for the purchase, the component of the credit card issuer system denies this sale transaction of the goods and/or services using the linked credit card. One or more denial messages of the sale transaction of the goods and/or services using the credit card account are communicated to the retail point-of-sale system. On the other hand, if the component of the credit card issuer system confirms the presence of adequate funds from the credit card account (and, in certain instances, further confirms the inapplicability of any credit card usage controls), the component of the credit card issuer system authorizes the sale of the goods and/or services. The component of the credit card issuer system communicates one or more authorization messages of the transaction to the retail point-of-sale system to complete the sale of the goods and/or services. In addition to authorizing the purchase, the component of the credit card issuer system increases (at the time or purchase or subsequently upon settlement of the purchase) the amount of credit card debt associated with the linked credit card. Such an increase of the amount of credit card debt associated with the linked credit card corresponds to an decrease (subject to any modifications of a dynamic credit limit) of an amount of credit available associated with the credit card. Such a completed purchase of the goods and/or services is associated with a transaction identification which one or more components of the system store for reporting purposes.

In certain embodiments, in addition to determining whether or not to complete an attempted purchase transaction initiated by a credit card based on an amount of funds available in association with a credit card account to cover the cost of the purchase transaction, the determination of whether to complete the attempted purchase transaction is based on whether the requested purchase complies with any credit card usage controls associated with the purchase transaction. In these embodiments, if a determination occurs that the requested purchase transaction complies with any applicable credit card usage controls, the component of the credit card issuer system proceeds with the determination of whether or not to authorize the purchase transaction based on the amount of funds currently associated with the credit card account as described above. On the other hand, if a determination occurs that the requested purchase transaction violates any applicable credit card usage controls, the component of the credit card issuer system (and/or other system that applies one or more applicable credit card usage controls) denies the purchase transaction.

In addition to authorizing the credit card initiated transaction (subject to any credit card usage controls), the component of the credit card issuer system operates to settle the funds associated with the transaction with the retailer upon a settlement event. Such a settlement event occurs automatically at a preset interval or point in time, automatically in real time, and/or responsive to one or more inputs received to initiate the settlement event. In these embodiments, upon an occurrence of the settlement event, a financial institution associated with the retailer operates with a financial institution associated with the account of the credit card to cause a transfer of an amount of funds from the financial institution associated with the credit card to the financial institution account associated with the retailer.

In addition to a user employing a credit card linked to one or more gaming establishment accounts to make zero, one or more purchases, the system enables a user to pay off charges incurred using the credit card with an amount of funds held in such gaming establishment accounts. In these embodiments, upon an attempted occurrence of a credit card payment event, the components of the systems individually or collectively determine whether or not to pay part or all of the amount owed on the credit card using an amount of funds maintained in one or more gaming establishment accounts. In these embodiments, upon an attempted occurrence of a credit card payment event, the credit card issuer system communicates with a component of the gaming establishment fund management system to request a transfer of an amount of funds from one or more gaming establishment accounts to cover the cost of the attempted payment. The gaming establishment fund management system determines whether or not to approve the transfer of the amount of funds. That is, upon the requested transfer of funds to pay off part or all of an amount of debt owed on a credit card, the gaming establishment fund management system logs the user into a gaming establishment account associated with the user (if necessary) and determines whether to authorize the transfer of the amount of funds requested to complete the credit card debt payment. In these embodiments, a component of the gaming establishment fund management system (e.g., one or more servers that maintain one or more gaming establishment accounts associated with the user) determines whether the amount of funds currently maintained in association with the gaming establishment account is at least equal to the requested amount of funds to complete the credit card debt payment transaction.

If the component of the gaming establishment fund management system indicates that the amount of funds available from the gaming establishment account (or gaming establishment accounts if multiple accounts are linked with a credit card) is insufficient to complete the credit card debt payment transaction, the component of the gaming establishment fund management system denies using an amount of funds from the gaming establishment account to pay off an amount of debt incurred in association with a credit card. One or more denial messages of the credit card debt payment transaction are communicated to the user. On the other hand, if the component of the gaming establishment fund management system confirms the presence of adequate funds from the gaming establishment account (or gaming establishment accounts if multiple accounts are linked with a credit card), the component of the gaming establishment fund management system authorizes the transfer of an amount of funds from the gaming establishment account to the financial institution account associated with the credit card to pay off part or all of the credit card debt. In these embodiments, such a transfer results in a decrease of the balance of cashable funds of the gaming establishment account and a corresponding decrease (subject to any fees associated with the transaction) of the amount of credit card debt associated with the linked credit card. Such a decrease of the amount of credit card debt associated with the linked credit card corresponds to an increase (subject to any modifications of a dynamic credit limit) of an amount of credit available associated with the credit card.

Figure 2A:
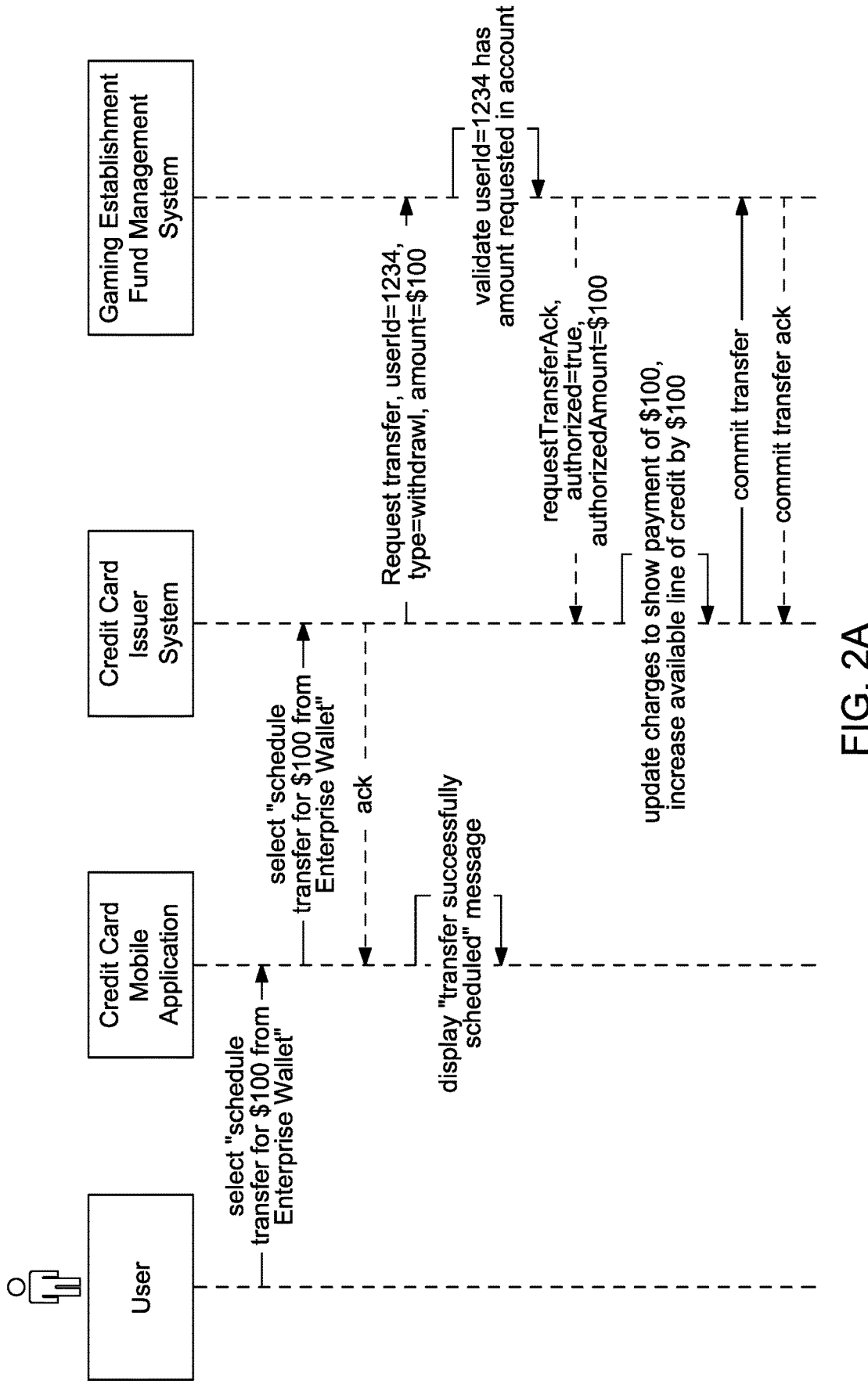
FIGS. 2A and 2B are flow charts of example processes for operating a system which employs funds maintained in a gaming establishment account to settle a debt associated with an account accessible via a linked credit card.

Accordingly, in various embodiments, the system of the present disclosure enables an amount of debt associated with a credit card to be paid off using an amount of funds in a gaming establishment account, thereby saving the user time and the system resources via the elimination of certain fund transfers. For example, as seen in FIG. 2A (which illustrates the described interactions between the user, the credit card issuer system, the credit card mobile application associated with the credit card issuer system and the gaming establishment fund management system), certain embodiments of present disclosure enable the scheduling of funds held in a gaming establishment account to be used to pay off part or all of an amount of funds owed on a credit card account resulting in an increase of the amount of funds available for future credit card initiated transactions. Such a configuration of holding funds in a gaming establishment account until such funds are requested to settle debt incurred in association with one or more credit card facilitated purchases provides a frictionless experience via not requiring users to transfer funds from their gaming establishment account to another account to then be used to pay for prior credit card facilitated purchases. Such a configuration of utilizing a credit card linked to a gaming establishment account to make purchases further affords the user additional consumer protection for use of the credit card (relative to other purchase funding options) as well as enhanced loyalty benefits for use of the credit card (relative to other purchase funding options).

In certain embodiments, the credit card payment event occurs (or is otherwise attempted to occur subject to adequate funds in the gaming establishment account) following a conclusion of a credit card billing period during which payment of a credit card balance is due according to the terms of the credit card agreement. In certain such embodiments, the credit card payment event occurs via the user manually choosing, such as via a mobile device application and/or accessing a website associated with the financial institution that maintains the credit card account, to pay off their credit card bill after they've received their latest statement for the billing period. In such embodiments, the credit card payment event is associated with an amount, and the amount could be selected manually by the user, an amount of "last statement amount", or an amount of "current outstanding amount". In certain embodiments, the attempted credit card payment event occurs automatically based on one or more triggering conditions being satisfied. In certain such embodiments, the credit card payment event occurs via a scheduled recurring mechanism, such as on the 5th day of the month, a certain number of days after a billing period closes or a certain number of days or hours before a bill for a billing period must be paid. In certain embodiments, the credit card payment event is scheduled at periodic intervals, such as daily or weekly, with the amount to transfer being the amount charged (charges pending and/or charges settled) during the previous interval, such as the previous day or week.

Figure 2B:
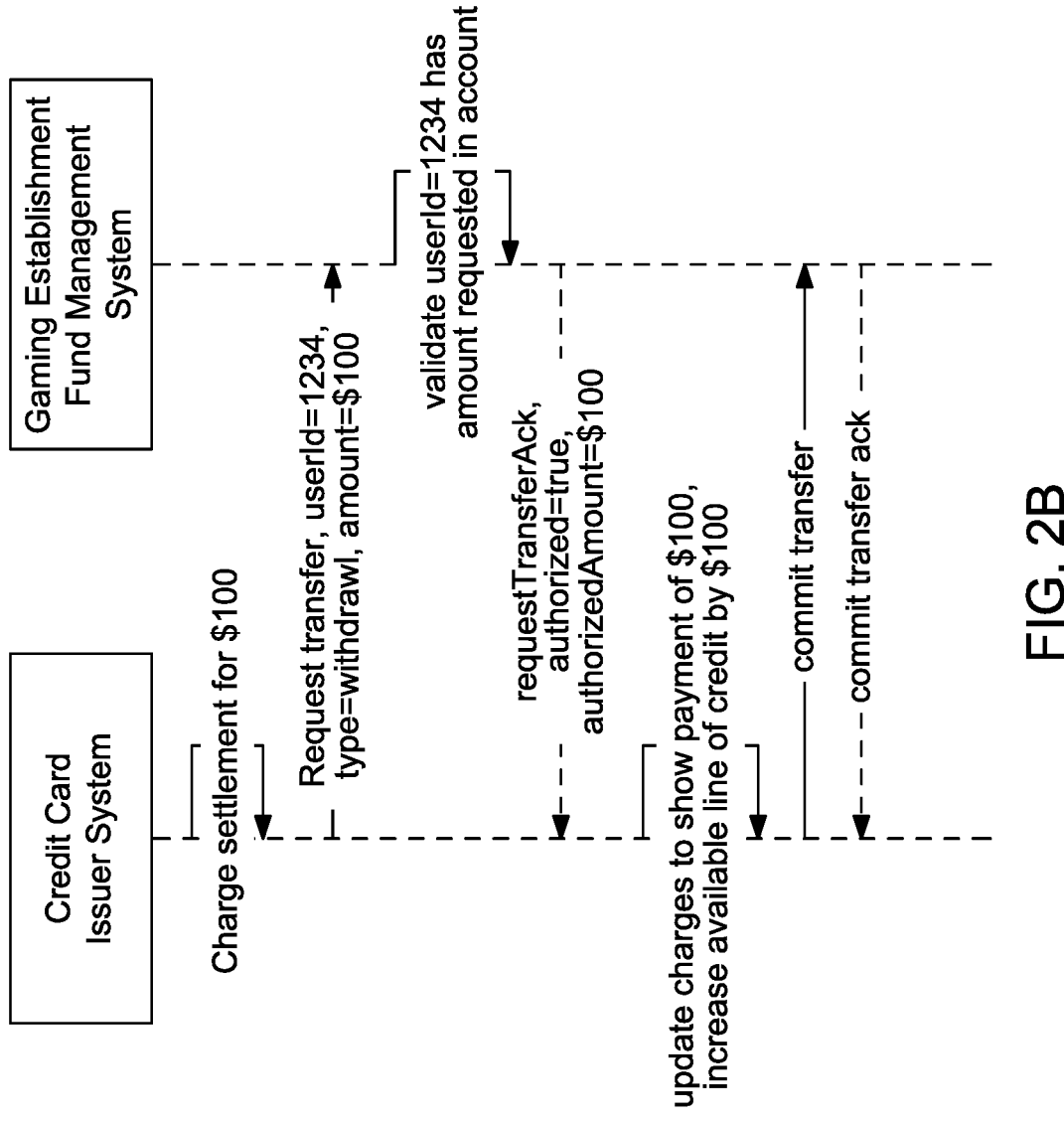

In certain embodiments, the credit card payment event occurs (or is otherwise attempted to occur subject to adequate funds in the gaming establishment account) prior to a conclusion of a credit card billing period but after a settlement of the credit card charge, such as automatically upon settlement of a credit card purchase transaction. In certain such embodiments, the credit card payment event occurs via the user manually choosing, such as via a mobile device application and/or accessing a website associated with the financial institution that maintains the credit card account, to pay off the amount charged in association with one or more credit card purchase transactions. In certain embodiments, the credit card payment event occurs automatically based on one or more triggering conditions being satisfied. In certain such embodiments, the credit card payment event qualifies as a just-in-time payment that occurs responsive to the receipt of a credit card authorization request due to the user making a purchase using the linked credit card, and the amount to be transferred is the amount of the purchase. In another embodiment, a credit card payment event qualifies as a just-in-time payment that occurs responsive to the settlement of a credit card authorization request to the user making a purchase using the linked credit card, and the amount to be transferred is the amount of the purchase. For example, as seen in FIG. 2B (which illustrates the described interactions between the credit card issuer system and the gaming establishment fund management system), certain embodiments of present disclosure enable the automatic use of funds held in a gaming establishment account to be used to pay off part or all of an amount of funds associated with a settled credit card transaction resulting in an increase of the amount of funds available for future credit card initiated transactions. Such a configuration of employing just-in-time payments using funds otherwise held in a gaming establishment account provides the user significantly improved consumer protection (relative to an eWallet associated with a debit card) as afforded by use of a credit card (and associated consumer protection laws), and further enables the user to participate in a loyalty program with superior rewards per the same amount spent due to the higher merchant fees associated with credit card purchases.

In certain embodiments, the system utilizes cashable credits maintained in a gaming establishment account to pay off part or all of an amount of credit card debt incurred using a linked credit card. In other embodiments, the system additionally or alternatively utilizes promotional cashable credits maintained in a gaming establishment account to pay off part or all of an amount of credit card debt incurred using a linked credit card. In other embodiments, the system additionally or alternatively utilizes non-cashable credits maintained in a gaming establishment account to pay off part or all of an amount of credit card debt incurred using a linked credit card. In other embodiments, the system additionally or alternatively utilizes points, such as player tracking points, maintained in a gaming establishment account to pay off part or all of an amount of credit card debt incurred using a linked credit card. In these different embodiments, the system utilizes one or more conversion factors associated with such promotional cashable credits, non-cashable credits and/or points. In certain such embodiments, the system employs different conversion factors based on the type of currency (other than cashable credits) attempted to be used, an amount owed, an identity of the user, a status or ranking of the user, a time of the transaction, and/or any promotions associated with the conversion.

In certain embodiments, since certain jurisdictions require that the amount of funds associated with one or more gaming establishment accounts maintained by a gaming establishment fund management system for one or more users are secured by a corresponding amount of funds in one or more financial institution accounts for the gaming establishment, to account for the credit card facilitated use of funds flowing to and/or from such a gaming establishment account based on the occurrence of one or more credit card payment events, the system causes, either in association with each credit card payment event or in association with a plurality of credit card payment events, the transfer of funds between the different financial institution accounts associated with the gaming establishment and the credit card. Such settlement transfers ensure that such funds are moved to the financial institution account associated with the credit card and that the amounts maintained in the gaming establishment account maintained by the gaming establishment comply with jurisdictional requirements by accounting for the amounts moved to the financial institution account. In certain such embodiments, To account for the flow of funds between the gaming establishment fund management system and the credit card issuer system, a transfer of funds from a gaming establishment account to pay off part or all of an amount of debt incurred using a linked credit card triggers a corresponding transfer of funds between a backing financial institution account, such as a backing bank account, associated with the gaming establishment fund management system that holds funds representing some or all of the funds the user holds in their gaming establishment account. In certain embodiments, the backing financial institution account is an account specifically associated with only a certain user's gaming establishment account. In certain other embodiments, the backing financial institution account is associated with a plurality of user's gaming establishment accounts and the gaming establishment fund management system (and/or another system tasked with tracking funds) tracks funds held within that account for each user (e.g., the account balance is $1,000,000, but user 1234 only has $500 of that balance associated with their gaming establishment account).

In operation of one embodiment in which the financial institution account that backs the gaming establishment account is maintained by a different financial institution than the financial institution that maintains the account associated with the linked credit card, when a requested payment of an amount of credit card debt to be paid from a gaming establishment account is approved, the gaming establishment fund management system schedules an ACH transfer between the financial institution account backing the user's gaming establishment account to the financial institution account associated with the user's linked credit card. In operation of another embodiment in which the financial institution account that backs the gaming establishment account is maintained by a different financial institution than the financial institution that maintains the account associated with the linked credit card, the component of the credit card issuer system schedules an ACH transfer between the financial institution account that backs the user's gaming establishment account to pay part or all of the credit card debt. In certain embodiments, certain details associated with the user's gaming establishment account are included as transaction details of a requested ACH transfer for the ACH transfer from the financial institution account that backs the gaming establishment account to be approved. In one such embodiment, these details relate to the transfer transaction and/or the underlying credit card charge. In one embodiment, a transfer occurs via the backing financial institution accounts and not via the association with the user's gaming establishment account. In another embodiment, an original credit transaction ("OCT") transfer occurs between the financial institution account backing the user's gaming establishment account and the financial institution account associated with the linked credit card.

In certain embodiments, the financial institution account that backs the gaming establishment account is maintained by the same financial institution that maintains the account associated with the linked credit card. In these embodiments, the financial institution manages the appropriate debits and credits without requiring a cross bank transfer, such as an ACH transfer. It should be appreciated that this approach helps minimize fees (as no cross-bank transfers occur on ACH or OCT rails), while also enabling for real-time transfers (which eliminates the two to three day time period required for an ACH transfer to complete).

Figure 3:
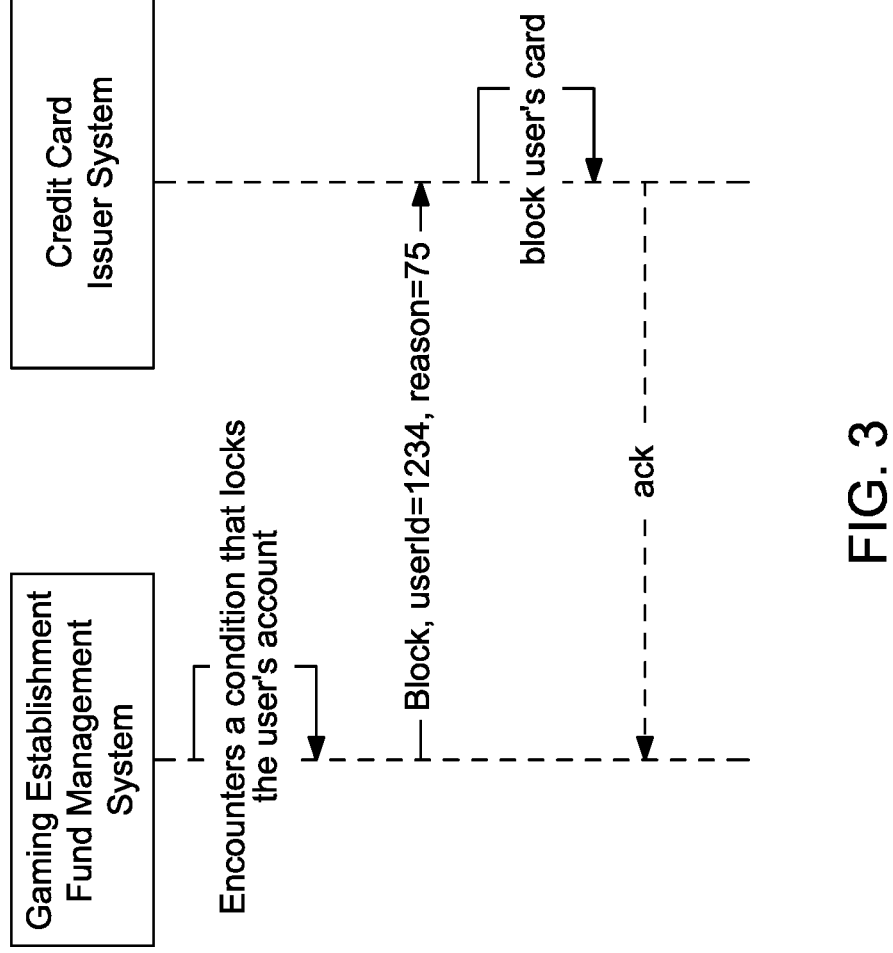
FIG. 3 is a flow chart of an example process for operating a system which illustrates the interactions between different components which operate to synchronize the blocking of use of a credit card associated with an account linked to a gaming establishment account.

In certain embodiments, the gaming establishment fund management system and/or the credit card issuer system monitor the transactions occurring in association with one or more accounts maintained by such systems. In these embodiments, if one of such systems determines a suspected transaction, that system notifies the other system such that multiple accounts from multiple systems are synchronized against any potential wrongdoing. In certain such embodiments, certain actions that result in a blocking or restriction of use of the linked credit card result in corresponding blocking or restriction of use associated with the gaming establishment account. In certain additional or alternative embodiments, certain actions performed on a gaming establishment account cause a restriction or locking of a linked credit card. For example, as seen in FIG. 3 (which illustrates the described interactions between the gaming establishment fund management system and the credit card issuer system), if the gaming establishment fund management system blocks a gaming establishment account of a user due to suspected illegal activity, then the gaming establishment fund management system notifies the credit card issuer system of such a block (which proceeds to lock the linked credit card (or otherwise deny certain charges attempted with the linked credit card). In this example (not shown), upon an unblocking of the gaming establishment account, such as upon a resolution of the concern surrounding the suspected suspicious activity), the gaming establishment fund management system notifies the credit card issuer system of such a unblocked account (which proceeds to unblock the linked credit card).

As evidenced by the various embodiments described, the system of the present disclosure integrates or otherwise links one or more gaming establishment accounts maintained by a gaming establishment fund management system with a credit card associated with a financial account to potentially transfers funds from one or more gaming establishment accounts maintained by the gaming establishment fund management system to the financial account associated with the credit card to settle part or all of the credit card account balance. Such a configuration of holding funds in a gaming establishment account until such funds are requested to settle debt incurred in association with one or more credit card facilitated purchases provides a frictionless experience via not requiring users to transfer funds from their gaming establishment account to another account to then be used to pay for prior credit card facilitated purchases. Such a configuration of utilizing a credit card linked to a gaming establishment account to make purchases further affords the user additional consumer protection for use of the credit card (relative to other purchase funding options) as well as enhanced loyalty benefits for use of the credit card (relative to other purchase funding options).

In various embodiments, prior to using funds in a gaming establishment account, such as using funds in a gaming establishment account to pay off a credit card, the system enables the gaming establishment account to be funded from one or more sources. In certain embodiments, the system enables the gaming establishment account to be directly funded from one or more of such sources. In certain embodiments, the system enables the gaming establishment account to be indirectly funded from one or more of such sources, such as by an amount of funds from such sources first being transferred to another gaming establishment account and then such an amount of funds being transferred from the other gaming establishment account to the gaming establishment account.

In certain embodiments, the gaming establishment account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment account is associated with a gaming establishment or a group of gaming establishments, wherein the user establishes a gaming establishment account by a deposit of funds (such as at a kiosk) to be subsequently utilized in association with the mobile device application. In other embodiments, the gaming establishment account is funded via a mobile device electronic fund transfer, such using Apple Pay™ or Android Pay™. It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facilitate the transfer of funds from a third-party account. In certain embodiments, the system enables funds to be deposited in a gaming establishment account via activating a line of credit associated with the user.

In certain embodiments, the system enables funds to be deposited in a gaming establishment account, via a gaming device, such as an EGM and/or via a non-gaming device, such as a kiosk. In certain embodiments, the system enables a user that has an amount of cash to utilize a gaming device and/or a non-gaming device to convert the cash to an amount deposited into a gaming establishment account (which may be subsequently transferred utilizing a mobile device application). In other embodiments, the system enables funds to be deposited in a gaming establishment account via a gaming device and/or a non-gaming device that accepts printed ticket vouchers. In these embodiments, the system enables a user that has one or more printed ticket vouchers to utilize a gaming device and/or a non-gaming device to convert the printed ticket voucher to an amount deposited into a gaming establishment account (which may be subsequently transferred utilizing a mobile device application).

In certain embodiments, the system enables funds to be deposited in a gaming establishment account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment account (which may be subsequently transferred utilizing a mobile device application). In other embodiments, the system enables funds to be deposited in a gaming establishment account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment account (which may be subsequently transferred utilizing a mobile device application).

In certain embodiments, the gaming establishment account is associated with funds associated with one or more virtual ticket vouchers. In certain embodiments, the system enables a user associated with an amount of virtual ticket vouchers to utilize a gaming device (e.g., an EGM, or a component of an EGM), a non-gaming device (e.g., a kiosk), a mobile device running a mobile device application, and/or a gaming establishment interface to convert the virtual ticket vouchers to an amount deposited into a gaming establishment account.

It should be appreciated that the electronic fund data transfers of the present disclosure may occur in addition to or as an alternative from cash-based fund transfers and/or ticket voucher-based fund transfers. In one such embodiment, an amount of funds transacted at a retail point-of-sale terminal is funded via any of an electronic fund transfer, a cash-based fund transfer or a ticket voucher-based fund transfer. In another embodiment, an amount of funds transacted at a retail point-of-sale terminal is funded via an electronic fund transfer or a cash-based fund transfer (but is not funded via any ticket voucher-based fund transfer). In another embodiment, an amount of funds transacted at a retail point-of-sale terminal is funded via an electronic fund transfer or a ticket voucher-based fund transfer (but is not funded via any cash-based fund transfer). In another embodiment, an amount of funds transacted at a retail point-of-sale terminal is funded via an electronic fund transfer (but is not funded via a cash-based fund transfer nor a ticket voucher-based fund transfer).

It should be further appreciated that any functionality or process of the present disclosure may be implemented via one or more servers (associated with or independent of any component of any system disclosed herein), one or more non-gaming establishment devices (e.g., a point-of-sale terminal of a retailer located external to and independent of a gaming establishment), a mobile device application, one or more gaming establishment devices (e.g., a gaming device such as an EGM or a non-gaming device such as a point-of-sale terminal of a retailer located within or otherwise associated with a gaming establishment), and/or one or more components of a gaming establishment system (such as a component of a gaming establishment management system supported by or otherwise located inside a gaming establishment device and/or a non-gaming establishment device). Accordingly: (i) while certain functions, features or processes are described herein as being performed by a non-gaming establishment device, such functions, features or processes may alternatively be performed by one or more servers, or one or more mobile device applications, one or more gaming establishment devices, and/or one or more gaming establishment components, and (ii) while certain functions, features or processes are described herein as being performed by one or more servers (e.g., a server of a credit card issuer system, a server of a gaming establishment fund management system and/or a server of a retail point-of-sale system), such functions, features or processes may alternatively be performed by one or more gaming establishment devices, one or more components of a gaming establishment system, one or more non-gaming establishment devices, one or more mobile device applications, or one or more gaming establishment components.

In certain embodiments, the above-described embodiments of the present disclosure may be implemented in accordance with or in conjunction with zero, one or more components of a gaming establishment fund management system (e.g., a cashless wagering system or a gaming establishment retail system); zero, one or more components of a credit card issuer system; zero, one or more components of a gaming establishment patron management system; zero, one or more components of a retail point-of-sale system; and/or zero, one or more gaming establishment devices. In these embodiments, such components of the gaming establishment fund management system, the credit card issuer system, the gaming establishment patron management system, the retail point-of-sale system and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the credit card issuer system, the component of the retail point-of-sale system and/or the gaming establishment device; (3) accessing memory to configure or reconfigure parameters in the memory according to indicia read from the component of the gaming establishment fund management system, the component of the credit card issuer system, the component of the retail point-of-sale system and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the credit card issuer system, the component of the retail point-of-sale system and/or the gaming establishment device, while in other embodiments, at least one component of the controller resides outside of the housing of the component of the gaming establishment fund management system, the component of the credit card issuer system, the component of the retail point-of-sale system and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the credit card issuer system, the component of the retail point-of-sale system and/or the gaming establishment device disclosed herein. In certain embodiments, the at least one memory device resides within the housing of the component of the gaming establishment fund management system, the component of the credit card issuer system, the component of the retail point-of-sale system and/or the gaming establishment device, while in other embodiments at least one component of the at least one memory device resides outside of the housing of the component of the gaming establishment fund management system, the component of the credit card issuer system, the component of the retail point-of-sale system and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the credit card issuer system, the component of the retail point-of-sale system and/or the gaming establishment device; (2)

associations between configuration indicia read from the component of the gaming establishment fund management system, the component of the credit card issuer system, the component of the retail point-of-sale system and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the credit card issuer system, the component of the retail point-of-sale system and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the credit card issuer system, the component of the retail point-of-sale system and/or the gaming establishment device to control the component of the gaming establishment fund management system, the component of the credit card issuer system, the component of the retail point-of-sale system and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the credit card issuer system, the component of the retail point-of-sale system and/or the gaming establishment device through any suitable data network described above (such as an Internet or intranet).

The at least one memory device also stores a plurality of device drivers. Examples of different types of device drivers include device drivers for the component of the gaming establishment fund management system, the component of the credit card issuer system, the component of the retail point-of-sale system and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the component of the credit card issuer system, the component of the retail point-of-sale system and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the component of the credit card issuer system, the component of the retail point-of-sale system and/or the gaming establishment device loads the new device driver from the at least one memory device to enable communication with the new device. For instance, one type of card reader in the component of the gaming establishment fund management system, the component of the credit card issuer system, the component of the retail point-of-sale system and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the credit card issuer system, the component of the retail point-of-sale system and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the credit card issuer system, the component of the retail point-of-sale system and/or the gaming establishment device. In various embodiments, the display devices serve as digital glass configured to aspects of the gaming establishment in which the component of the gaming establishment fund management system, the component of the credit card issuer system, the component of the retail point-of-sale system and/or the gaming establishment device is located. In various embodiments, the component of the gaming establishment fund management system, the component of the credit card issuer system, the component of the retail point-of-sale system and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the credit card issuer system, the component of the retail point-of-sale system and/or the gaming establishment device receives an actuation, the component of the gaming establishment fund management system, the component of the credit card issuer system, the component of the retail point-of-sale system and/or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the credit card issuer system, the component of the retail point-of-sale system and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the credit card issuer system, the component of the retail point-of-sale system and/or the gaming establishment device. In certain embodiments, the component of the gaming establishment fund management system, the component of the credit card issuer system, the component of the retail point-of-sale system and/or the gaming establishment device displays a sequence of audio and/or visual attraction messages during idle periods to attract potential users to the component of the gaming establishment fund management system, the component of the credit card issuer system, the component of the retail point-of-sale system and/or the gaming establishment device. The videos may be customized to provide any appropriate information.

The at least one input device may include any suitable device that enables an input signal to be produced and received by the at least one processor of the component of the gaming establishment fund management system, the component of the credit card issuer system, the component of the retail point-of-sale system and/or the gaming establishment device. In one embodiment, the at least one input device includes a payment device configured to communicate with the at least one processor of the component of the gaming establishment fund management system, the component of the credit card issuer system, the component of the retail point-of-sale system and/or the gaming establishment device to fund the component of the gaming establishment fund management system, the component of the credit card issuer system, the component of the retail point-of-sale system and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the credit card issuer system, the component of the retail point-of-sale system and/or the gaming establishment device to be funded via an electronic funds transfer, such as a transfer of funds from a bank account. In another embodiment, the component of the gaming establishment fund management system, the component of the credit card issuer system, the component of the retail point-of-sale system and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the credit card issuer system, the component of the retail point-of-sale system and/or the gaming establishment device. When the component of the gaming establishment fund management system, the component of the credit card issuer system, the component of the retail point-of-sale system and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the credit card issuer system, the component of the retail point-of-sale system and/or the gaming establishment device operator to, when actuated, cause the component of the gaming establishment fund management system, the component of the credit card issuer system, the component of the retail point-of-sale system and/or the gaming establishment device to perform particular functions. For instance, such buttons may be hard keys, programmable soft keys, or icons icon displayed on a display device of the component of the gaming establishment fund management system, the component of the credit card issuer system, the component of the retail point-of-sale system and/or the gaming establishment device that are actuatable via a touch screen of the component of the gaming establishment fund management system, the component of the credit card issuer system, the component of the retail point-of-sale system and/or the gaming establishment device or via use of a suitable input device of the component of the gaming establishment fund management system, the component of the credit card issuer system, the component of the retail point-of-sale system and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the credit card issuer system, the component of the retail point-of-sale system and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the credit card issuer system, the component of the retail point-of-sale system and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the credit card issuer system, the component of the retail point-of-sale system and/or the gaming establishment device, such as one or more rechargeable power sources (e.g., rechargeable batteries) located at the component of the gaming establishment fund management system, the component of the credit card issuer system, the component of the retail point-of-sale system and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the credit card issuer system, the component of the retail point-of-sale system and/or the gaming establishment device; detecting the presence and/or identity of various persons (e.g., users, casino employees, etc.), devices (e.g., user input devices), and/or systems within a predetermined proximity to the component of the gaming establishment fund management system, the component of the credit card issuer system, the component of the retail point-of-sale system and/or the gaming establishment device.

The at least one data preservation component is configured to detect or sense one or more events and/or conditions that, for example, may result in damage to the component of the gaming establishment fund management system, the component of the credit card issuer system, the component of the retail point-of-sale system and/or the gaming establishment device and/or that may result in loss of information associated with the component of the gaming establishment fund management system, the component of the credit card issuer system, the component of the retail point-of-sale system and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the credit card issuer system, the component of the retail point-of-sale system and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the credit card issuer system, the component of the retail point-of-sale system and/or the gaming establishment device. For example, in one implementation, the at least one geolocation module is configured to receive GPS signal information for use in determining the position or location of the component of the gaming establishment fund management system, the component of the credit card issuer system, the component of the retail point-of-sale system and/or the gaming establishment device. In another implementation, the at least one geolocation module is configured to receive multiple wireless signals from multiple remote devices (e.g., component of the gaming establishment fund management system, the gaming establishment patron management system, the retail point-of-sale system and/or the gaming establishment devices, servers, wireless access points, etc.) and use the signal information to compute position/location information relating to the position or location of the component of the gaming establishment fund management system, the component of the credit card issuer system, the component of the retail point-of-sale system and/or the gaming establishment device.

The at least one user identification module is configured to determine the identity of the current user or current owner of the component of the gaming establishment fund management system, the component of the credit card issuer system, the component of the retail point-of-sale system and/or the gaming establishment device. For example, in one embodiment, the current user is required to perform a login process at the component of the gaming establishment fund management system, the component of the credit card issuer system, the component of the retail point-of-sale system and/or the gaming establishment device in order to access one or more features. Alternatively, the component of the gaming establishment fund management system, the component of the credit card issuer system, the component of the retail point-of-sale system and/or the gaming establishment device is configured to automatically determine the identity of the current user based on one or more external signals, such as an RFID tag or badge worn by the current user and that provides a wireless signal to the component of the gaming establishment fund management system, the component of the credit card issuer system, the component of the retail point-of-sale system and/or the gaming establishment device that is used to determine the identity of the current user. In at least one embodiment, various security features are incorporated into the component of the gaming establishment fund management system, the component of the credit card issuer system, the component of the retail point-of-sale system and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the credit card issuer system, the component of the retail point-of-sale system and/or the gaming establishment device.

In various embodiments, the component of the gaming establishment fund management system, the component of the credit card issuer system, the component of the retail point-of-sale system and/or the gaming establishment device includes a plurality of communication ports configured to enable the at least one processor of the component of the gaming establishment fund management system, the component of the credit card issuer system, the component of the retail point-of-sale system and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the credit card issuer system, the component of the retail point-of-sale system and/or the gaming establishment device has a support structure, housing, or cabinet that provides support for a plurality of the input devices and the output devices of the component of the gaming establishment fund management system, the component of the credit card issuer system, the component of the retail point-of-sale system and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A gaming establishment fund management system comprising:
   a processor; and
   a memory device that stores a plurality of instructions that, when executed by the processor, cause the processor to:
      maintain a gaming establishment cashless wagering account independent of any servers of any credit card issuers,
      responsive to determining to restrict access to funds associated with the gaming establishment cashless wagering account, interface with a server of a credit card issuer to communicate data that results in a restriction of access to use of a credit card maintained independent of the gaming establishment cashless wagering account, and
      responsive to a receipt, from the server of the credit card issuer, of data associated with a request for payment of an amount of debt incurred in association with the credit card:
         determine whether to authorize the payment of the amount of debt incurred in association with the credit card, the determination being based on a balance of the gaming establishment cashless wagering account,
         responsive to the determination being to authorize the payment of the amount of debt incurred in association with the credit card, automatically initiate a transfer of an amount of funds associated with the amount of debt from the gaming establishment cashless wagering account to an account associated with the credit card maintained by the server of the credit card issuer independent of the gaming establishment fund management system and independent of the gaming establishment cashless wagering account, and
         responsive to the determination being not to authorize the payment of the amount of debt incurred in association with the credit card, interface with the server of the credit card issuer to communicate data associated with a denial of the request.

2. The gaming establishment fund management system of claim 1, wherein the balance of the gaming establishment cashless wagering account comprises a balance of cashable funds and the determination to authorize the payment of the amount of debt incurred in association with the credit card occurs responsive to the balance of cashable funds of the gaming establishment cashless wagering account at least equaling the amount of debt incurred in association with the credit card.

3. The gaming establishment fund management system of claim 1, wherein the data associated with the request for payment of the amount of debt incurred in association with the credit card is received responsive to a user input.

4. The gaming establishment fund management system of claim 1, wherein the data associated with the request for payment of the amount of debt incurred in association with the credit card is automatically received based on a schedule.

5. The gaming establishment fund management system of claim 1, wherein the amount of funds is associated with an amount of non-cashable credits.

6. The gaming establishment fund management system of claim 5, wherein the memory device stores a plurality of further instructions that, when executed by the processor, cause the processor to convert the amount of non-cashable credits to the amount of funds based on a conversion factor.

7. The gaming establishment fund management system of claim 1, wherein the automatically initiated transfer comprises a transfer of the amount of funds associated with the amount of debt from a financial institution account that backs the gaming establishment cashless wagering account.

8. A gaming establishment fund management system comprising:

a processor; and a memory device that stores a plurality of instructions that, when executed by the processor, cause the processor to:

maintain a gaming establishment cashless wagering account independent of any servers of any credit card issuers, responsive to an occurrence of a fund transfer event, interface with a component of a gaming establishment patron management system supported by a housing of an electronic gaming machine to cause a transfer of a first amount of funds from the gaming establishment cashless wagering account to a credit balance of the electronic gaming machine to enable a wager of at least a portion of the first amount of funds, responsive to determining to restrict access to funds associated with the gaming establishment cashless wagering account, interface with a server of a credit card issuer to communicate data that results in a restriction of access to use of a credit card maintained independent of the gaming establishment cashless wagering account, and responsive to an occurrence of a credit card payment event following an issuance of a credit card statement:

determine if a second amount of funds associated with the gaming establishment cashless wagering account at least equals an amount of funds owed in association with the credit card, and responsive to the determination that the second amount of funds associated with the gaming establishment cashless wagering account at least equals the amount of funds owed in association with the credit card, interface with the server of the credit card issuer to automatically cause a transfer of at least the amount of funds owed in association with the credit card from the gaming establishment cashless wagering account to an account associated with the credit card that is maintained by the server of the credit card issuer independent of the gaming establishment fund management system and independent of the gaming establishment cashless wagering account.

9. The gaming establishment fund management system of claim 8, wherein the amount of funds owed in association with the credit card is less than a total amount of funds due in association with the credit card statement.

10. A method of operating a gaming establishment fund management system, the method comprising:

maintaining, by a processor, a gaming establishment cashless wagering account independent of any servers of any credit card issuers;

responsive to determining to restrict access to funds associated with the gaming establishment cashless wagering account, interfacing with a server of a credit card issuer to communicate data that results in a restriction of access to use of a credit card maintained independent of the gaming establishment cashless wagering account, and responsive to a receipt, from the server of the credit card issuer, of data associated with a request for payment of an amount of debt incurred in association with the credit card:

determining, by the processor, whether to authorize the payment of the amount of debt incurred in association with the credit card, the determination being based on a balance of the gaming establishment cashless wagering account, responsive to the determination being to authorize the payment of the amount of debt incurred in association with the credit card, automatically initiating, by the processor, a transfer of an amount of funds associated with the amount of debt from the gaming establishment cashless wagering account to an account associated with the credit card maintained by the server of the credit card issuer independent of the gaming establishment fund management system and independent of the gaming establishment cashless wagering account, and responsive to the determination being not to authorize the payment of the amount of debt incurred in association with the credit card, interfacing with the server of the credit card issuer to communicate data associated with a denial of the request.

11. The method of claim 10, wherein the balance of the gaming establishment cashless wagering account comprises a balance of cashable funds and the determination to authorize the payment of the amount of debt incurred in association with the credit card occurs responsive to the balance of cashable funds of the gaming establishment cashless wagering account at least equaling the amount of debt incurred in association with the credit card.

12. The method of claim 10, wherein the data associated with the request for payment of the amount of debt incurred in association with the credit card is received responsive to a user input.

13. The method of claim 10, wherein the data associated with the request for payment of the amount of debt incurred in association with the credit card is automatically received based on a schedule.

14. The method of claim 10, wherein the amount of funds is associated with an amount of non-cashable credits.

15. The method of claim 14, further comprising converting, by the processor, the amount of non-cashable credits to the amount of funds based on a conversion factor.

16. The method of claim 10, wherein the automatically initiated transfer comprises a transfer of the amount of funds associated with the amount of debt from a financial institution account that backs the gaming establishment cashless wagering account.

* * * * *